United States Patent
Liu et al.

(10) Patent No.: US 9,235,757 B1
(45) Date of Patent: Jan. 12, 2016

(54) FAST TEXT DETECTION

(71) Applicant: Amazon Technologies, Inc., Reno, NV (US)

(72) Inventors: Yue Liu, Brighton, MA (US); Oleg Rybakov, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/477,031

(22) Filed: Sep. 4, 2014

Related U.S. Application Data

(60) Provisional application No. 62/028,560, filed on Jul. 24, 2014.

(51) Int. Cl.
  *G06K 9/00* (2006.01)
  *G06K 9/62* (2006.01)
  *G06K 9/32* (2006.01)

(52) U.S. Cl.
  CPC ............ *G06K 9/00456* (2013.01); *G06K 9/325* (2013.01); *G06K 9/6232* (2013.01)

(58) Field of Classification Search
  None
  See application file for complete search history.

(56) References Cited

U.S. PATENT DOCUMENTS

| | | | | |
|---|---|---|---|---|
| 3,582,887 | A * | 6/1971 | Guthrie | G06K 9/36 382/256 |
| 5,245,674 | A * | 9/1993 | Cass | G06K 9/32 382/181 |
| 6,173,073 | B1 * | 1/2001 | Wang | G06K 9/00449 382/171 |
| 6,778,700 | B2 * | 8/2004 | Karidi | G06K 9/00456 358/462 |
| 2003/0026480 | A1 * | 2/2003 | Karidi | G06K 9/00456 382/176 |
| 2005/0264571 | A1 * | 12/2005 | Stamm | G06T 11/203 345/469 |
| 2010/0054585 | A1 * | 3/2010 | Guillou | G06K 9/3266 382/164 |
| 2012/0134581 | A1 * | 5/2012 | Matsuda | H04N 1/56 382/164 |
| 2012/0287456 | A1 * | 11/2012 | Innami | H04N 1/00482 358/1.13 |
| 2013/0129216 | A1 * | 5/2013 | Tsai | G06K 9/325 382/170 |
| 2013/0290376 | A1 * | 10/2013 | Dong | G06F 17/30289 707/802 |
| 2014/0003723 | A1 * | 1/2014 | Lu | G06K 9/3258 382/182 |
| 2014/0023271 | A1 * | 1/2014 | Baheti | G06K 9/4661 382/171 |
| 2014/0023274 | A1 * | 1/2014 | Barman | G06K 9/78 382/182 |
| 2014/0023278 | A1 * | 1/2014 | Krishna Kumar | G06K 9/4671 382/192 |
| 2014/0026054 | A1 * | 1/2014 | Rav-Acha | G06F 3/04883 715/723 |

OTHER PUBLICATIONS

Chen, et al. Detecting and Reading Text in Natural Scenes. Computer Vision and Pattern Recognition, 2004. CVPR 2004. Proceedings of the 2004 IEEE Computer Society Conference. vol. 2, pp. II-366. IEEE, 2004.

Matas, et al. Robust Wide Baseline Stereo from Maximally Stable Extremal Regions. Image and Vision Computing. vol. 22, No. 10, British Machine Vision Computing 2002—Special Issue, pp. 384-393, 2004.

(Continued)

*Primary Examiner* — Aaron W Carter
(74) *Attorney, Agent, or Firm* — Seyfarth Shaw LLP; Ilan N. Barzilay; David A. Klein

(57) ABSTRACT

A system that identifies and recognizes text that offers reduced the computational complexity for processing complex images. Widths of scan line segments within candidate text regions are determined, with the shortest segments selected as being representative of stroke width. Statistical features of the stroke widths are used as part of the process to classify each region as containing or not containing a text character or glyph.

20 Claims, 12 Drawing Sheets

(56) References Cited

OTHER PUBLICATIONS

Neumann, et al. A Method for Text Localization and Recognition in Real-World Images. Computer Vision—ACCV 2010, pp. 770-783. Springer Berlin Heidelberg, 2011.

Neumann, et al. Text Localization in Real-World Images Using Efficiently Pruned Exhaustive Search. Document Analysis and Recognition (ICDAR), 2011 International Conference. IEEE, 2011.

Shahab, et al. Robust Reading Competition Challenge 2: Reading Text in Scene Images. Document Analysis and Recognition (ICDAR), 2011 International Conference. pp. 1491-1496. IEEE, 2011.

Viola, et al. Rapid Object Detection Using a Boosted Cascade of Simple Features. Computer Vision and Pattern Recognition, 2001. CVPR 2001. Proceedings of the 2001 IEEE Computer Society Conference. vol. 1. IEEE, 2001.

Chang, et al. LIBSVM: A Library for Support Vector Machines. ACM Transactions on Intelligent Systems and Technology (TIST). vol. 2, No. 3 (2011); updated online 2013.

\* cited by examiner

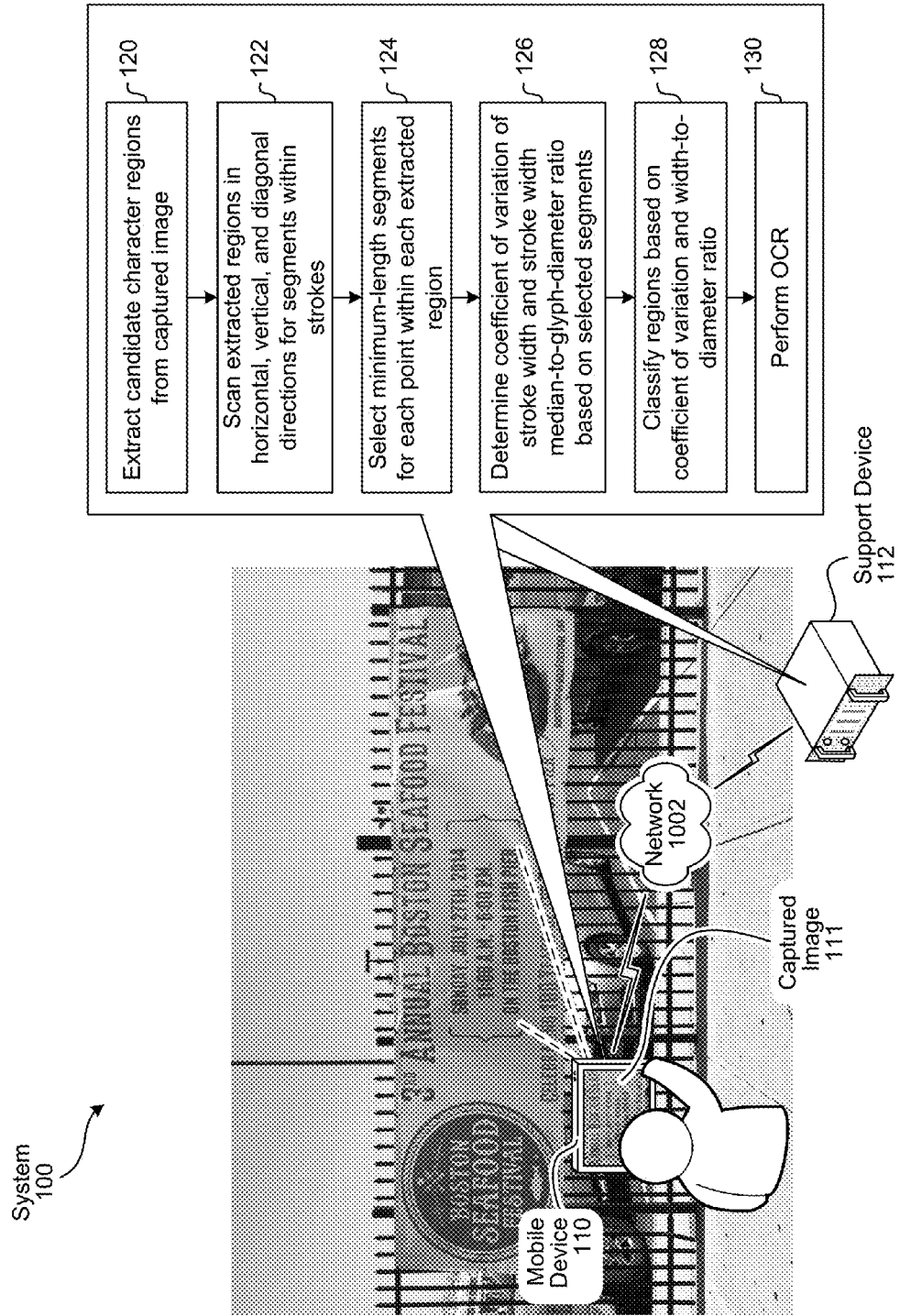

Captured Image 211

Extracted MSERs 220

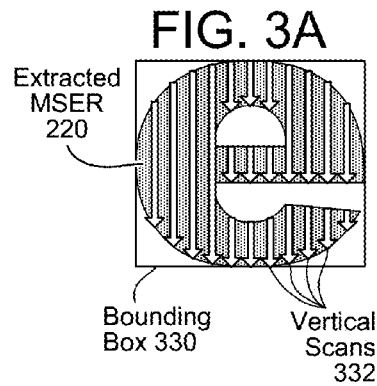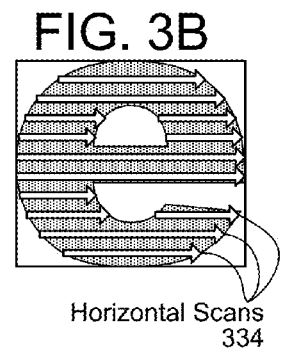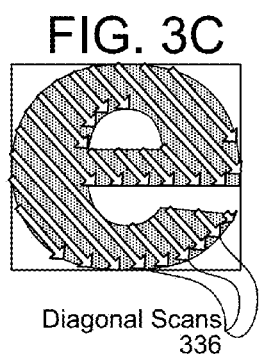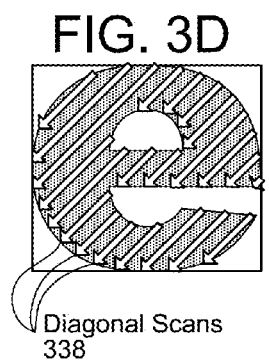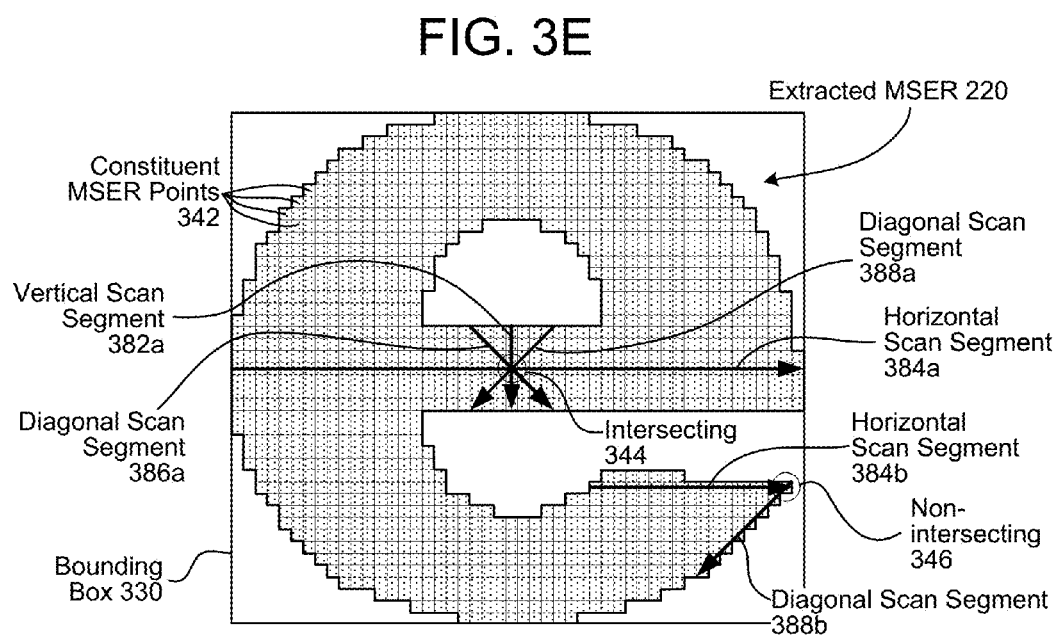

Captured Image 711a

MSERs 720

Postively Classified MSERs 724

Bounding Box 730

Line Identification 756

Grouped Glyph Bounding Box 758a

Binarized Image 760

Locally Binarized Image without Outliers 762a

Grouped Glyph + Outlier Bounding Box 758b

Binarized Image 760

Locally Binarized Image with Outliers 762b

MSERs 720  MSER Mask 764

Positively-Classified MSER Binarized Mask 766

Positively-Classified MSER + Outlier MSER Binarized Mask 768

Captured Image 711b

Positively-Classified MSER + Outlier MSER Binarized Mask 772

Positively-Classified MSER + Outlier MSER Binarized Mask 774

FAST TEXT DETECTION

PRIORITY CLAIM

Priority is claimed to U.S. Provisional Patent Application 62/028,560, filed Jul. 24, 2014 and entitled "Fast Text Detection," an entirety of which is incorporated herein by reference.

BACKGROUND

Mobile electronic devices such as tablet computers and smart phones commonly include cameras. Software on the mobile device may process captured images to identify and recognize text and glyph symbols.

BRIEF DESCRIPTION OF DRAWINGS

For a more complete understanding of the present disclosure, reference is now made to the following description taken in conjunction with the accompanying drawings.

FIG. 1 illustrates a system for fast text detection and recognition.

FIGS. 3A to 3E illustrate scanning an extracted candidate text region to determine minimum stroke widths.

DETAILED DESCRIPTION

Figure 2A:
FIGS. 2A and 2B illustrate an example of extracting candidate text regions from a captured image.

One of the important use cases of captured-image processing is to identify text in a scene. Processing may consume one-or-more camera live-view frames to detect text regions. If there are text regions, a frame may be binarized (converting each pixel into 1-bit representing black or white) and then the text regions in the binarized frame are processed using optical character recognition (OCR). If there is any error in text detection stage, the accuracy of OCR processing may be diminished. This results in a design tradeoff for text processing: making text identification more accurate typically increases computational complexity, taking more time and requiring more battery power, whereas making text identification faster and less complex typically reduces accuracy.

FIG. 1 illustrates a system 100 for accurately identifying and recognizing text that offers reduced the computational complexity for processing complex images. Step 120 to 130 are performed by a mobile device 110, a network-connected support device 112, or a combination thereof.

Based on a captured image 111, a set of candidate character regions are identified and extracted (120) using a technique such as maximally stable extremal regions (MSERs) on a grayscale version of a captured image. MSERs are a method of blob detection in images. Each "blob" contains a pixel intensity pattern that the MSER algorithm determines might convey a text character or glyph (i.e., is a "candidate" region that probably includes a text character or a glyph), but further processing is required to determine whether each candidate region (i.e., each blob) comprises an actual character or glyph. As performed by system 100, the MSER candidate-region extraction process may be done in two passes: one pass to extract dark features on light background and the other pass to extract light features on dark background.

MSER candidate region detection algorithms are described by J. Matas, O. Chum, M. Urban, and T. Pajdla. in "Robust wide baseline stereo from maximally stable extremal regions," published in the Proceedings of the British Machine Vision Conference, pages 384-396, in 2002, the contents of which are incorporated herein by reference for explanation of MSER detection algorithms. Numerous refinements and improvements on MSER detection algorithms have been published since the 2002 Matas paper, and the MSER detection algorithms that may be used with the disclosed processes are not limited to the original algorithms in the 2002 paper. Other image processing algorithms may be used instead of, or in combination with, MSER detection algorithms in order to identify candidate character locations in the captured image.

MSERs are well-suited to extracting elements where an image element is warped or skewed, and are relatively unaffected by variations in image intensities. Although some extracted MSER candidate regions may not correspond to text/glyphs, the MSER algorithm reduces overall computational overhead by identifying the regions of the image that may contain text/glyphs, since determining whether a region is a true character location is ordinarily more computationally intensive than the MSER algorithm.

Each candidate region may be defined as a set of coordinate points, where the arrangement of coordinate points defines the shape and area of the candidate region. The coordinate points may correspond to pixels within the original captured image, or may be of a different size/scale than the original pixels (e.g., larger). Each extracted candidate region is individually scanned (122) in the horizontal, vertical, and diagonal directions for scan segments that are within character "strokes."

The word "stroke" is a term that originated with handwritten calligraphy and referred to a single calligraphic mark moving in one direction across a writing surface. As used in modern typography, strokes refer to the lines that make up a glyph such as an alphanumeric text character (e.g., a letter or number), Kanji character, Hanzi character, Hangul character, Hindi character, Cyrillic character, etc. The "width" of a stroke is the cross-sectional width of a constituent line forming the glyph. In basic "san serif" fonts, the stroke width may be consistent throughout a glyph (i.e., the line or lines forming the glyph have a consistent thickness), whereas in stylized fonts, the stroke width of a single glyph may vary.

The scanning (122) is done by scanning across the candidate region and detecting where the pixels change from light-to-dark and/or dark-to-light, in effect detecting the inner and outer contours of what may be a glyph, letter, number, etc. The distance between each transition is potentially a width of a stroke, and the widths of the stroke(s) may be approximated based on these distances (e.g., the length from the outer transition from light-to-dark to the inner transition from dark-to-light, and vice-versa). As some candidate regions may not contain glyphs, detected transitions in those regions may not be actual strokes, but rather, lines or other patterns captured in the image 111.

For each discrete point of the candidate region where a horizontal, vertical, and left-and-right diagonal scan segments intersect, a minimum scan segment distance is selected (124) from among the four intersecting scan segments. Thus, each point within the area of the candidate region is associated with a minimum scan segment distance relative to that point. The direction of the minimum scan segment selected for each point is independent of the direction of other minimum scan segments selected for other points within the same candidate region. As the direction of each selected minimum distance scan segment is irrelevant, if two scan segments tie for shortest distance, either scan segment may be selected.

A coefficient of variation (CV) of stroke width and a ratio of stroke-width median-to-glyph diameter are determined (126), based on the selected collection of minimum scan segment distances. Such features characterize "positional deviation" of the glyph.

In probability theory and statistics, the coefficient of variation (CV) is a normalized measure of dispersion of a probability distribution or frequency distribution. It is defined as the ratio of the standard deviation (commonly represented by the Greek letter sigma) to the mean (i.e., average, commonly represented by the Greek letter mu). The absolute value of the CV is sometimes known as relative standard deviation (RSD), which may be expressed as a percentage. The CV of the candidate region describes the dispersion of a variable that does not depend on the variable's measurement unit. The larger the CV, the greater the dispersion in the variable, which in this case is the selected set of minimum scan segment distances.

The ratio of stroke-width median-to-glyph diameter conveys whether a glyph is long or thin. The stroke-width median is the median distance of the selected shortest scan segment distances within a candidate region. The glyph diameter is the width of the glyph and corresponds to a width of the candidate region, which may be determined during scanning (122), may be based on the width of a bounding box around the candidate region, etc.

While determining the median shortest scan width distances may be a slower process than selecting the mean (the latency impact is minor, but there is an impact), the median reduces the influence of outlier scan segment widths to the classification of the candidate region. However, because the mean is calculated for the CV, the mean may be used instead of the median, ratios may be determined for both the mean and the median, and/or a ratio may be determined based on a combination of the mean and median.

The CV and width-to-diameter ratio(s) are combined with other salient features of a candidate region. The salient features may be based on local pixel/coordinate point patterns within the region, such as features known and used in the art for character classification.

The salient features may be identified by the region extraction algorithm (e.g., identified by the MSER algorithm) and/or other feature extraction algorithms, such as features based on intensity patterns, gradients, etc. Examples of the salient features will be discussed in further detail below.

The combined CV, median/mean width-to-diameter ratio(s), and salient features are input into a trained classifier (128). The trained classifier determines whether each region contains text characters/glyphs or not containing text/glyphs based on the input. The classifier system is trained from a training set containing a mix of true positives for characters and negatives for characters/glyphs (i.e., test images not having text). For a test image, the CV, median/mean-width-to-diameter ratio(s), and salient features are provided as input, and the trained classifier instructed as to which input data corresponds to text characters/glyphs, and which input data does not.

The trained classifier may be (among other things) a classifier system such as a Support Vector Machine (SVM) classifier employing a Radial Basis Function (RBF) kernel. The training set includes pre-selected images with sections that are already known to either include text or not include text. For example, the classifier is trained on images known to have various regions with characters and various regions without characters as obtained by manually annotating MSERs extracted from the pre-selected real-world images. The set of features used by the character classifier tend to be insensitive to differences in fonts and alphabets.

The regions classified as containing text characters/glyphs are further processed, and optical character recognition (OCR) is performed (130) to recognize the text.

The addition of the coefficient of variation (CV) of stroke width and the stroke width median-to-diameter ratio results in modest improvement in accurate classification over prior art approaches. For example, with a classifier re-trained to receive the CV and median-width-to-diameter ratio as input along with the other salient features of the candidate regions, overall classification accuracy improved by four percent over a classification system using the same salient features alone.

Also, while the addition of MSERs in the improved system may increase overall computational complexity for simple images, in comparison to prior art approaches, the improved system offers computational advantages when processing complex images (e.g., images with clutter, distorted text, low contrast, etc.). Among other advantages, the improved process does not require gradient and contour extractions and edge matching. Not requiring contour extractions is particularly advantageous when processing low contrast images, as the edge detection algorithms will often fail to detect a contour.

Figure 2B:
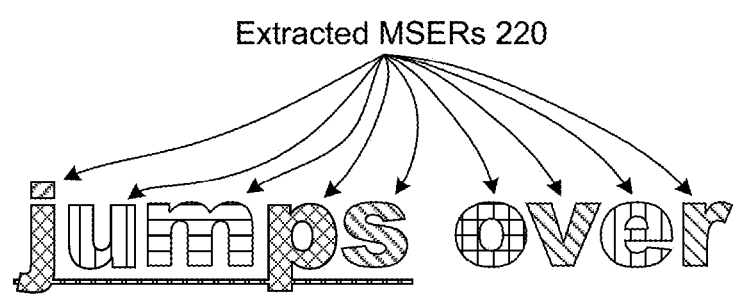

FIG. 2A illustrates a simple example of a captured image 211 comprising two words. The first word is underlined. FIG. 2B illustrates the MSERs 220 extracted (step 120) from the captured image 211. The extracted MSERs 220 are illustrated in FIG. 2B with different patterns to illustrate that adjacent glyphs in the image have been separately identified as candidate regions. However, the lower case "j" and "p" are connected by the underline, and therefore have been identified as a single MSER. In this example, such "connected" glyphs are treated as a single candidate region and are processed in a same manner as the individual glyphs. However, the dot over the lower case "j" is not connected to the "j" and "p", and has been extracted as an independent candidate character region, separate from the body of the "j".

FIGS. 3A to 3D illustrate the scanning (122) of an extracted region, and FIG. 3E illustrates the selection (124) of the minimum scan segment distance for each point within the candidate region. An extracted MSER 220 comprises a set of points, and is illustrated within a bounding box 330. The height and width of the bounding box 330 correspond to the height and width of the extracted MSER 220.

In FIG. 3A, the points within the region 220 are vertically scanned 332 from edge-to-edge, where the edge is defined by the transition in-and-out of the MSER 220. These transitions correspond to dark-to-light transitions and light-to-dark transitions (and vice versa) appearing in the original captured image 211. In FIG. 3B, the MSER 220 is horizontally scanned 334. In FIG. 3C, the MSER 220 is diagonally scanned down-and-right (336). And in FIG. 3D, the MSER is diagonally scanned down- and left (338).

The illustration of the extracted MSER 220 in FIG. 3E includes the grid of constituent coordinate points 342. As a data structure, an extracted MSER may be sets of coordinates characterizing boundaries of an extracted MSER. Based on the coordinates, an extracted MSER may be represented as a two-dimensional grid/array. Boundaries and/or coordinates within the boundaries of the extracted region 220 may be expressed by a binary one, while coordinates other than the coordinate points 342 are expressed as binary zeroes (or vice-versa). If overlaid on the original image, the array can be used to locally "mask" the underlying feature that the MSER algorithm identified as being a candidate region, as will be discussed further below in connection with binarization.

For each constituent coordinate point where a vertical scan segment (382), a horizontal scan segment (384), and both diagonal scan segments (386/388) intersect (as determined by the scans), the shortest scan segment distance is selected. For example, vertical scan segment 382a, horizontal scan segment 384a, diagonal scan segment 386a, and diagonal scan segment 388a intersect at a first coordinate point 344. Of these scan segments, the vertical scan segment 382a is the shortest, and therefore is selected as the first coordinate point's minimum scan segment distance. This process is performed for each constituent point 342 where scan segments from each of the scans intersect.

However, at some edge points, not all of the scan lines may intersect. For example, at a second coordinate point 346, a horizontal scan segment 384b and a diagonal scan segment 388b intersect, but the point lacks a vertical scan segment or the other diagonal scan segment, as there are no adjacent constituent points in those directions. To avoid skewing the median, a minimum scan segment distance may not be determined for the second coordinate point 346 and other points which lack a complete set of scan segments.

The coefficient of variation of stroke width and the stroke-width median-to-glyph-diameter ratio (and/or the stroke-width mean-to-glyph-diameter ratio) are determined (126) using the minimum scan segment distances determined for every coordinate point 342 where a complete set of scan segments intersect.

Figure 4:
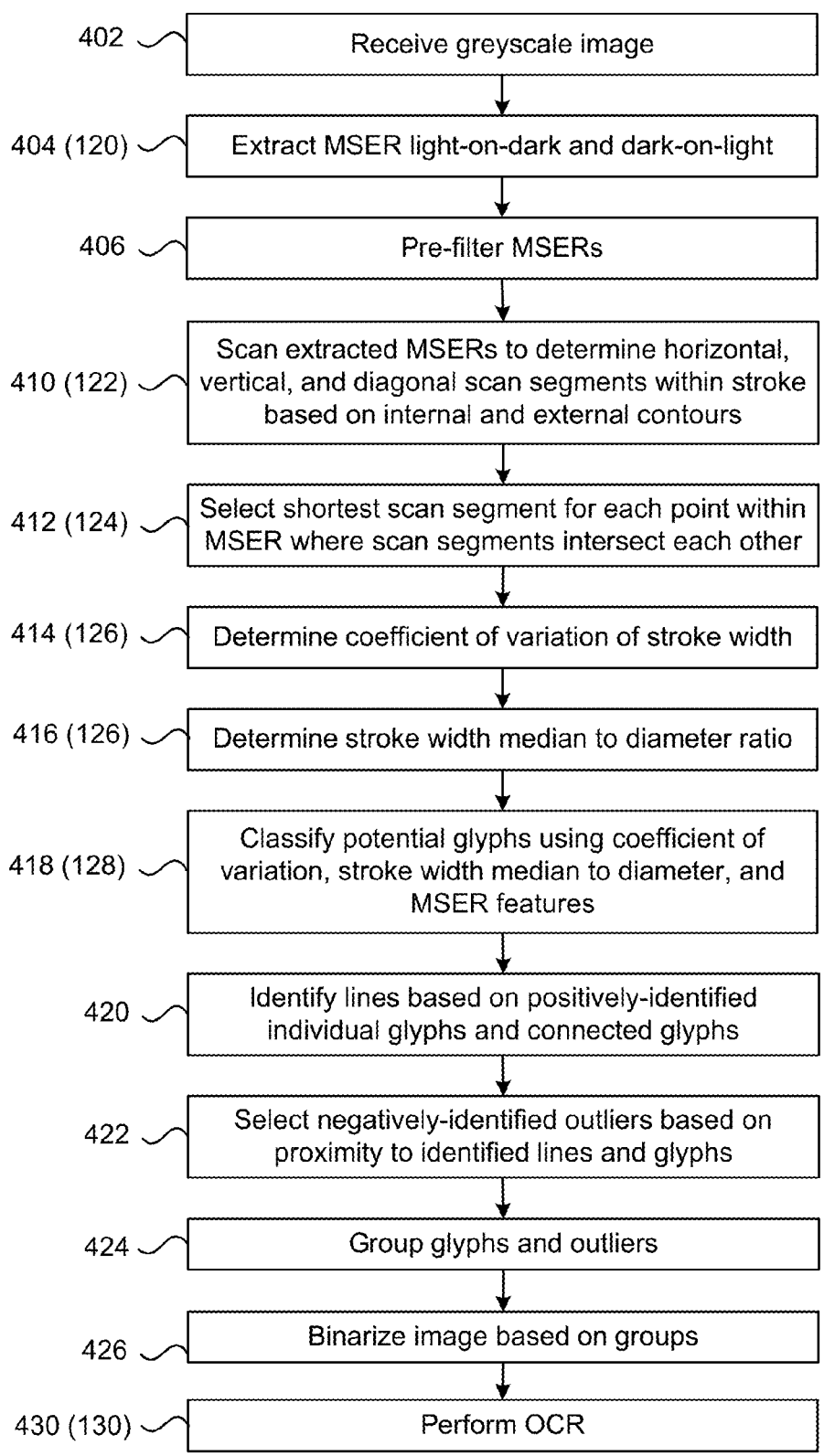
FIG. 4 is a process flow diagram describing a further example of the system of FIG. 1

FIG. 4 is a process-flow diagram that adds additional detail and steps to the system illustrated in FIG. 1. A captured image 111/211 is converted to greyscale, if not already in greyscale. After t receiving (402) the greyscale image, the candidate text regions are extracted (120/404) using an algorithm such as MSER. This extraction is performed for light-on-dark features and for dark-on-light features. Light-on-dark and dark-on-light extraction may be done as separate passes, or may be done sequentially or in parallel and then merged.

The output of the particular MSER algorithm outputs a set of points 342 for each candidate region 220. A pre-filtering (406) step or steps may be performed to eliminate candidate regions from further consideration that are unlikely to contain a glyph based on application of rules or rule-based heuristics, such as eliminating extracted MSERs 220 from classification processing based on the aspect ratio or relative size of an MSER's bounding box 330.

The extracted candidate regions are each individually scanned (122/410) in the horizontal, vertical, and both diagonal directions to determine scan segments within a stroke based on internal and external contours, as exemplified by FIG. 3A to 3E. The distance between contours may be determined (among other ways) in units of constituent points traversed by the respective scan segment. In FIGS. 3A to 3E, the distance of a scan segment is the length of the illustrated scan-line arrow. Scanning in the various directions may be performed in iteratively or in parallel (e.g., scanning vertically, horizontally, and diagonally at a same time as parallel processes).

The shortest scan segment is selected (124/412) as the minimum scan segment distance for each constituent point 342 within an MSER 220 where scan segments from the set of scans intersect (e.g., intersecting point 344 in FIG. 3E). Choosing the shortest scan segment at each constituent MSER point where the scan lines intersect avoids skewing characterization of the glyph based on outlier features.

As described above, a coefficient of variation (CV) of stroke width is determined (126/414) for each candidate region, as well as a ratio of stroke width median-to-glyph diameter (126/416), based on the selected collection of minimum scan segment distances for the respective candidate region. Since the mean of the minimum scan segment distances is calculated for the CV, the mean may be used instead of the median, ratios may be determined for both the mean and the median, and/or a ratio may be determined based on a combination of the mean and median.

The CV and stroke-width median/mean to diameter ratio(s) are combined with other salient features of a respective candidate region, and into a trained classifier, which classifies (128/418) each candidate region as either containing text characters/glyphs (a "positive" classification) or not containing text characters/glyphs (a "negative" classification).

A list of example characteristics that may be used as salient features of a candidate region for glyph classification is presented in Table 1, and will be explained in connection to FIGS. 5A to 5D:

TABLE 1

| Feature | Description |
| --- | --- |
| Aspect Ratio | (bounding box width/bounding box height) |
| Compactness | 4 * π * candidate glyph area/(perimeter)$^2$ |
| Solidity | candidate glyph area/bounding box area |
| Stroke-width to width ratio | maximum stroke width/bounding box width |
| Stroke-width to height ratio | maximum stroke width/bounding box height |
| Convexity | convex hull perimeter/perimeter |
| Raw compactness | 4 * π * (candidate glyph number of pixels)/(perimeter)$^2$ |
| Number of holes | number of holes in candidate region |

Figure 5A:
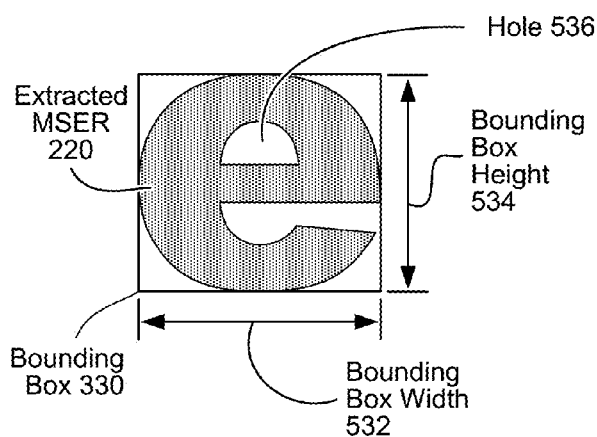
FIGS. 5A to 5D illustrate candidate region features.
Figure 5B:
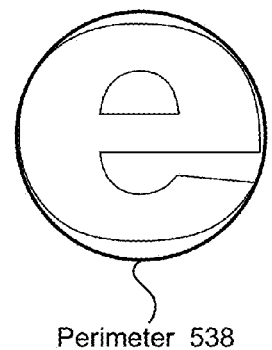

"Aspect ratio" is the bounding box width divided by the bounding box height. FIG. 5A illustrates an example of bounding box width 532 and height 534. "Compactness" is based on a ratio of the area of the shape to the area of a circle encompassing the shape. The "Compactness" of the candidate glyph is equal to four times the constant "Pi" times the area of the candidate region 220, divided by the square of the perimeter of the candidate region 538 of a circle encompassing the candidate character, as illustrated in FIG. 5B. An estimate of the perimeter 538 may be determined based on a longest distance between two edges of the MSER 220. The "solidity" is the area of candidate region 220 divided by the area of the bounding box 330. Referring back to FIG. 3E, the area of the candidate region 220 corresponds to the number of constituent points 342 within the MSER, whereas the area of the bounding box is the width 532 of the bounding box 330 times its height 534 (in the same units as the constituent points 342).

Figure 5C:
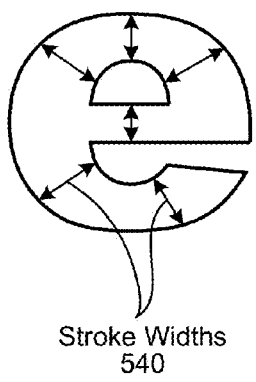

The "stroke-width to width ratio" is the maximum stroke width divided by the bounding box width 532, and the "stroke-width to height ratio" is the maximum stroke width divided by the bounding box height 534. FIG. 5C illustrates conventional stroke widths 540 A conventional approach to determining stroke width is to detect edges of the candidate character (e.g., using Canny edge detection), and then measure across the candidate character from one edge to an opposite edge. In particular, the measurement may be measured perpendicular to a tangent at one edge of the candidate character to a parallel tangent at an opposite edge. As typography in most languages has consistent stroke widths throughout the glyph, stroke widths that exhibit significant variation (e.g., exceeding a standard deviation of all stroke widths by a threshold value) may optionally be ignored when determining the maximum stroke width for classification.

Figure 5D:
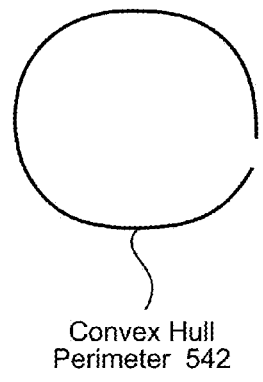

"Convexity" is a candidate region's convex hull perimeter divided by the perimeter 538. The edges of a candidate region may be expressed as a sequence of lines and curves. FIG. 5D illustrates an example convex hull perimeter 542, comprising those portions of the those peripheral portions of the MSER 220 that exhibit convex edges.

"Raw Compactness" is equal to four times the constant Pi times the number of constituent points 342 or pixels comprising the candidate region divided by the square of the perimeter 538. "Number of holes" is equal to the number of holes in the candidate region. As illustrated in FIG. 5A, the example MSER 220 includes a single hole 536.

Figure 6A:
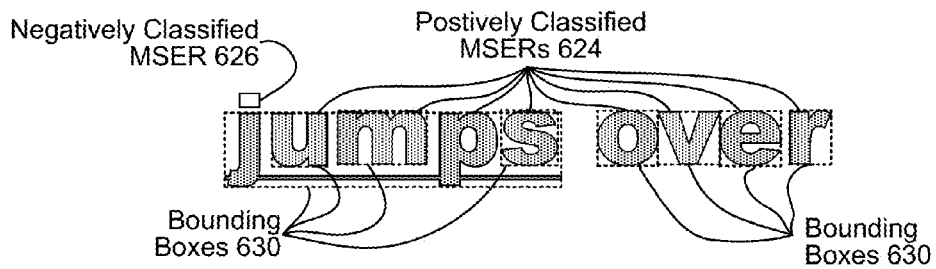
FIGS. 6A to 6D illustrate examples of line identification, grouping, and binarization.
Figure 6B:
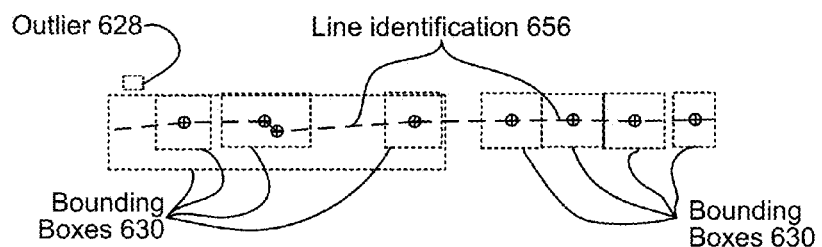

Lines of glyphs are identified (420) based on positively identified individual and connected glyphs. An example is illustrated in FIGS. 6A and 6B. Each positively-classified MSER 624 is associated with a bounding box 630 (which may be the same as bounding box 330, but is numbered differently in view of the region now being positively classified as a glyph). The MSER 626 including the tittle (i.e., the dot) over the lower case "j" has been negatively classified.

A line 656 of glyphs may be identified by a technique such as interpolation using the centers of the bounding boxes 630, as illustrated in FIG. 6B. If there are multiple lines of text in an image, the different lines are each identified. Text-line identification techniques are known in the art, and any technique may be used.

Negatively-classified regions (e.g., 626) may be identified and selected 422 as text-related "outliers" such as punctuation (e.g., periods, semicolons, commas), diacritic marks (e.g., umlauts, Latin tilde-N), decimals, and tittles (e.g., dots over lower case "i" and "j"). Outliers (e.g., 628 in FIG. 6B) may be identified by applying rules to features of negatively-classified MSERs (e.g., 626), such as their position and proximity relative to lines 656 formed by positively classified glyphs, their position and proximity relative to the bounding boxes 630, and the aspect ratio and relative size of the negatively-classified MSER. One or more distance thresholds may be used to identify and/or eliminate negatively classified regions as potential outliers, such as distance to a line passing through neighbor groups, and distance to the nearest bounding box 630.

Figure 6C:
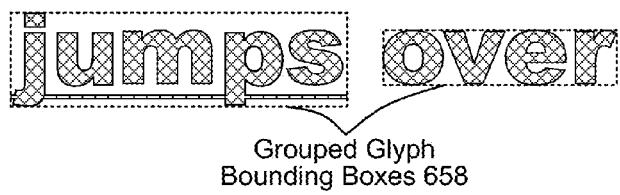
Figure 6D:

Based on proximity and arrangement along the identified lines 656, the glyphs and outliers are grouped 424 as illustrated in FIG. 6C. A bounding box 658 may be associated with each group of glyphs and outliers. As will be discussed further below, the grouped glyphs and outliers are binarized 426, resulting in a binarized image 662 as illustrated in FIG. 6D. Optical character recognition (OCR) is performed 130/430 on the binarized image 662, producing machine-recognized text.

Any binarization technique may be used, such as Otsu's thresholding. As known in the art, Otsu's method performs clustering-based image thresholding, or, the reduction of a gray level image to a binary image. The algorithm assumes that the image contains two classes of pixels following bi-modal histogram (foreground pixels and background pixels), it then calculates the optimum threshold separating the two classes so that their combined spread (intra-class variance) is minimal.

Figure 7A:
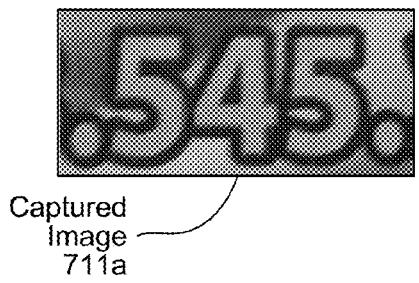
FIGS. 7A to 7M illustrate examples of steps and techniques for image binarization.
Figure 7B:
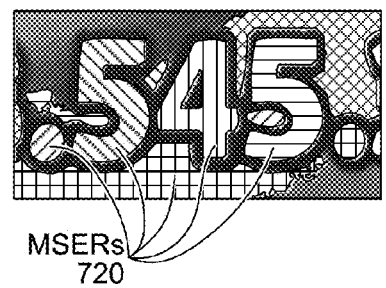

Some fonts and cluttered backgrounds can complicate the binarization process. FIG. 7A illustrates a portion 711*a* of an image that has such features. This example uses an outline font where the light character interiors are detected by the MSER algorithm (e.g., 120/404) with dark exterior/background features. As a result, as illustrated in FIG. 7B, light interstitial and surrounding regions may also be identified by MSERs 720, which are illustrated overlaid as a "mask" on the greyscale image 711*a*.

Figure 7C:
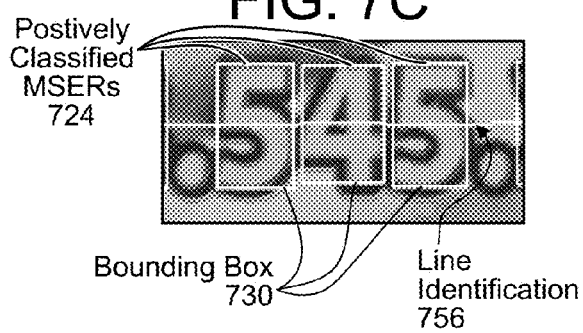

As illustrated in FIG. 7C, after candidate regions are positively classified (128/418), the bounding boxes 730 of the positively classified MSERs 724 are used to identify (420) a line of text 756.

Binarization may be localized using bounding boxes of grouped glyphs and outliers. While the entire binarized image may be used for OCR to retain as much information as possible, localized binarization has an advantage of reducing OCR complexity. Also, if the binarized image is compressed and sent from the mobile device 110 to the support device 112 for processing, reducing the areas of the binarized image that include content can reduce the size of the image file to be transmitted over the network 1002.

To locally binarize, areas outside of the grouped bounding boxes are blanked (e.g., set to zero or one depending upon whether binarization is configured to produces dark-on-light or light-on-dark), emptying the areas of content. This may be accomplished by binarizing the entire image and then blanking the areas outside of the grouped bounding boxes, or by binarizing the areas within the grouped bounding boxes and blanking the rest of the image.

Figure 7D:
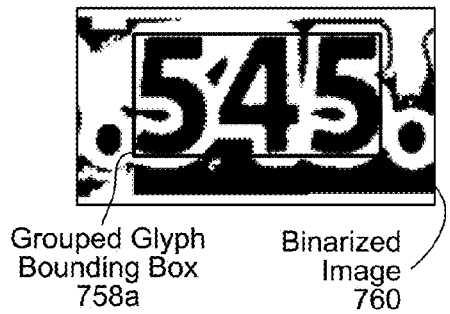
Figure 7E:
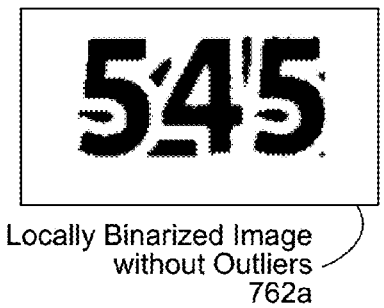
Figure 7F:
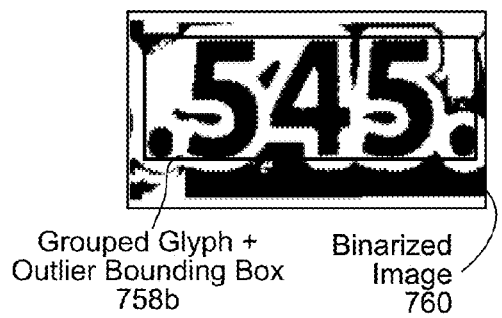
Figure 7G:
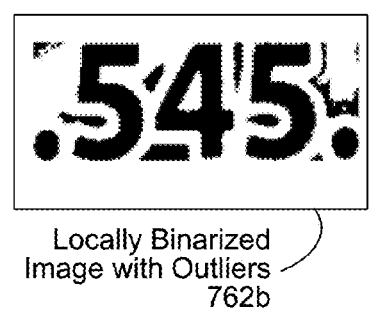

FIG. 7D illustrates a grouped-glyph bounding box 758*a* (omitting the outliers) overlaid on the binarized image 760. As shown in FIG. 7E, due to the complexity of the image, even if the area outside the bounding box 758*a* is blanked, there are non-text image artifacts within the bounding box that will complicate the OCR process. FIG. 7F illustrates the same binarized image 760 overlaid with a bounding box 758*b* that includes both glyphs and outliers. As illustrated in FIG. 7G, the expansion of the bounding box (relative to FIG. 7D) results in even more clutter in the blanked binarized image 762*b*. This clutter reduces the likelihood that OCR will be accurate.

Figure 7H:
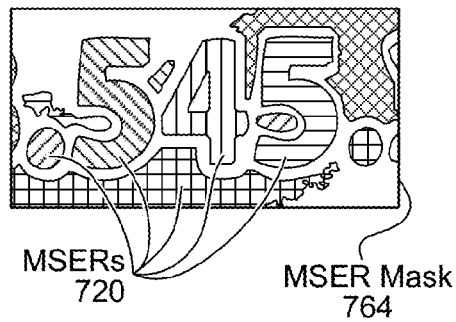
Figure 7I:
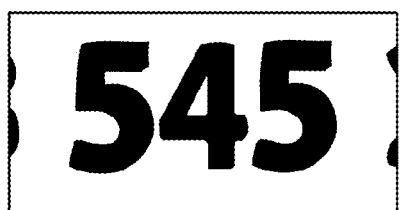
Figure 7J:
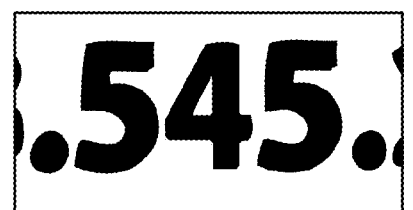

As an alternative binarization approach, the MSER mask 764 illustrated in FIG. 7H may be used for binarization (422). This mask is comprises the MSERs as originally identified during the extraction process 120/404. MSERs 724 that are positively classified may be retained as a binarized MSER mask 766, illustrated in FIG. 7I, with areas of the image outside of the positively classified MSERs blanked. Similarly, FIG. 7J illustrates a binarized MSER mask 768 that includes positively classified MSERs 724 and outliers (i.e., the periods before and after the positively identified glyphs 724. Using the MSERs to generate the binarized image can eliminate some or all of the background artifacts, in comparison to FIGS. 7E and 7G.

Figure 7K:
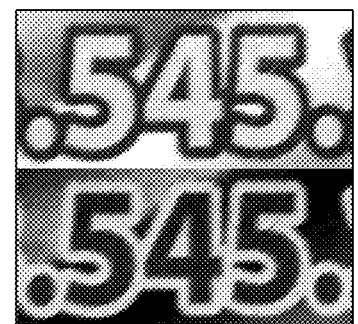
Figure 7L:
Figure 7M:

FIG. 7K illustrates a portion 711*b* of a captured image that includes both light-glyphs on a dark background and dark-glyphs on a light background. Since the extracted MSERs from the light-on-dark and dark-on-light passes each include sets of coordinates, these coordinates may be merged to produce a uniform image, such as the dark-text on light background image produced by the positively-classified MSERs plus outliers binarized mask 772 illustrated in FIG. 7L. However, based upon which pass the MSERs were identified, a binarized image may be produced that conveys the light-on-dark and dark-on-light distinction, as illustrated by the image produced by the positively-classified MSER and outliers binarized mask 774 illustrated in FIG. 7M.

Different approaches to binarization may be used for different portions of an image. For example, if there is a high density of interstitial clutter within a bounding box (e.g., black pixels within the grouped bounding box in between positively classified MSERs and outliers), the MSER-based approaches illustrated in FIGS. 7H to 7M may result in more favorable OCR results, whereas the default might be the process illustrated in FIG. 7G. Different binarization algorithms may be selectively applied. Also, if OCR process is unable to identify text in a region, the region may be re-binarized by a different method and OCR processed again. In addition, in the alternative to performing OCR on the entire binarized image, groups of glyphs and outliers may be processed separately (e.g., separately performing OCR processing on one or more grouped bounding boxes 658, 758a, 758b), facilitating parallel OCR processing.

For further explanation and examples of classifying candidate glyph regions using salient features such as those in Table 1, line estimation, binarization, and applying OCR to the results, see U.S. patent application Ser. No. 13/842,433 files Mar. 15, 2013 by Gray et al., entitled "Text Entity Recognition," which is incorporated by reference herein in its entirety.

Figure 8:
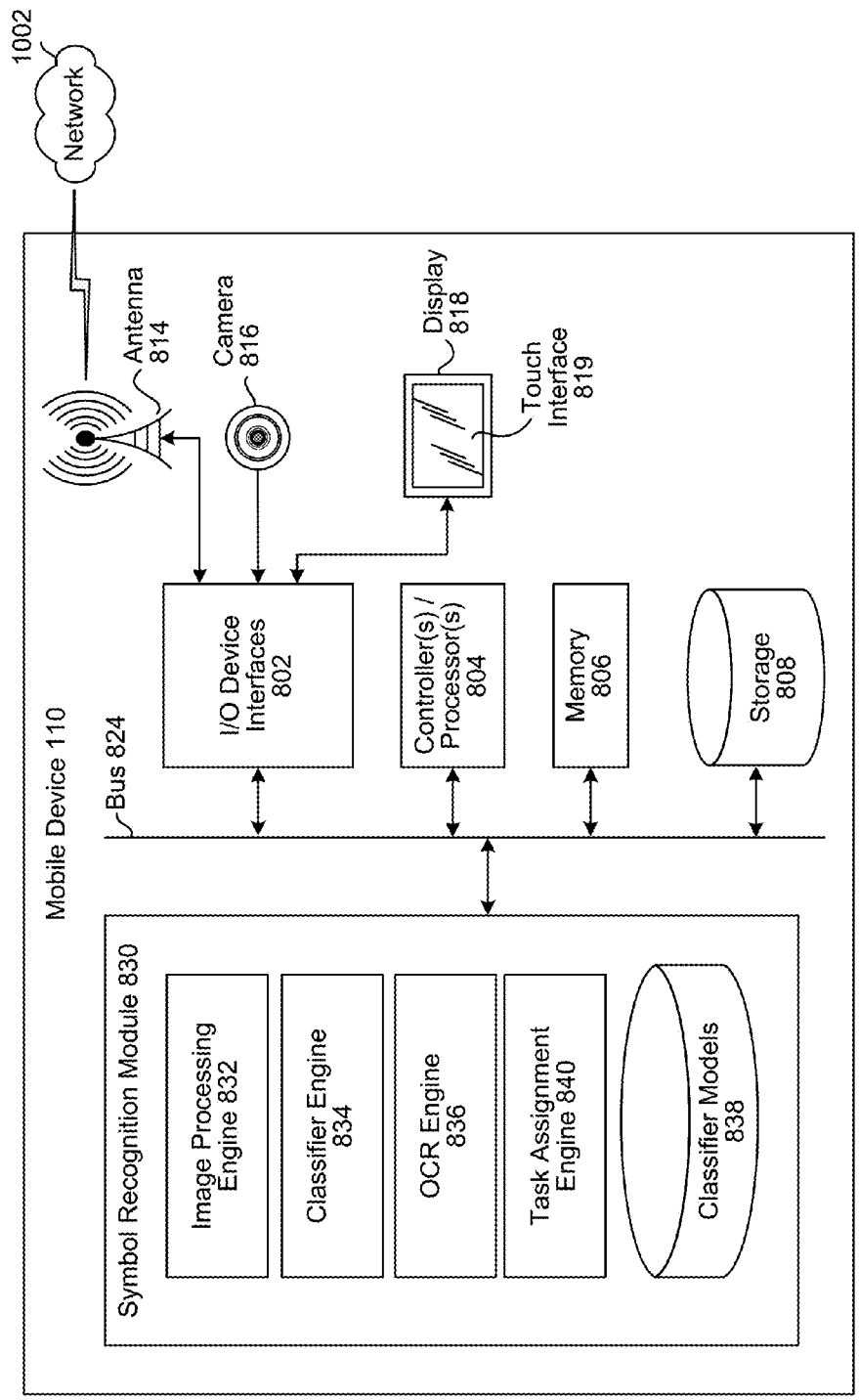
FIG. 8 is a block diagram conceptually illustrating example components of a mobile device configured for the system.

FIG. 8 is a block diagram conceptually illustrating example components of the hand-held device 110 of the system 100. In operation, the device 110 may include computer-readable and computer-executable instructions that reside on the device 110, or that may reside on a network-connected device operating in conjunction with device 110, as will be discussed further below.

As illustrated in FIG. 8, the device 110 may include wireless network radio connectivity (e.g., antenna 814), one or more cameras (816), a display 818, and a user interface such as touch interface 819. "Camera" includes image capture systems used to capture images, and includes (among other things), cameras used for photography and for the capture of video. Image scanners such as flat-bed optical scanners may be substituted for a camera to capture the image or images (e.g., 111, 211, 711a, 711b).

The display 818 may be a display of any suitable technology, such as a liquid crystal display, an organic light emitting diode display, electronic paper, an electrochromic display, or other suitable component(s). The cameras 816, display 818, and other components may be integrated into the device 110, or may be separate, connected to the device 110 by a wired or wireless connection.

The device 110 may include an address/data bus 824 for conveying data among components of the device 110. Each component within the device 110 may also be directly connected to other components in addition to (or instead of) being connected to other components across the bus 824.

The device 110 may include one or more controllers/processors 804, that may each include a central processing unit (CPU) for processing data and computer-readable instructions, and a memory 806 for storing data and instructions. The memory 806 may include volatile random access memory (RAM), non-volatile read only memory (ROM), non-volatile magnetoresistive (MRAM) and/or other types of memory. The device 110 may also include a data storage component 808, for storing data and controller/processor-executable instructions (e.g., instructions to perform the processes illustrated in, and discussed in connection with, FIGS. 1 and 4). The data storage component 808 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 802.

Computer instructions for operating the device 110 and its various components (such as the engines 832 to 836 and 840 of the symbol recognition module 830) may be executed by the controller(s)/processor(s) 804, using the memory 806 as temporary "working" storage at runtime. The computer instructions may be stored in a non-transitory manner in non-volatile memory 806, storage 808, or an external device. Alternatively, some or all of the executable instructions may be embedded in hardware or firmware in addition to or instead of software.

The device 110 includes input/output device interfaces 802. A variety of components may be connected through the input/output device interfaces 802, such as the display 818, a speaker (not illustrated), a microphone (not illustrated), and the user interface (e.g., touch interface 819). The input/output device interfaces 802 may also include an interface for an external peripheral device connection such as universal serial bus (USB), Thunderbolt or other connection protocol. The input/output device interfaces 802 may also include a connection to one or more networks 1002 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1002, the system 100 may be distributed across a networked environment, as will be discussed further below with FIG. 10.

The device 110 further includes a symbol recognition module 830 that may perform the processes discussed in connection with FIGS. 1 and 4, and/or works in conjunction with another device in the system 100. For example, a first device 110 may include the camera 816 and capture the image 111/211/711, whereas a second device 110 (or a support device 112 such as a server) includes all or part of the symbol recognition module 830 that processes the captured image 111/211/711, such as performing OCR (130/430).

The symbol recognition module 830 includes an image processing engine 832. Among other things, the image processing engine 832 identifies the set of candidate character regions (e.g., MSERs) (120/404), aggregates the identified positive regions into sequences and identifies lines (420), identifies outliers (422), groups the glyphs and outliers (424) for binarization, performs binarization (426), scans candidate regions to determine CV and the stroke-width to median diameter ratio (122-126, 410-416), and identifies other salient features used for glyph classification (e.g., Table 1). If any other pre-processing of the image is performed prior to classification (e.g., conversion to greyscale, pre-filtering MSERS 406), that may also be performed by the image processing engine 832.

A classifier engine 834 of the symbol recognition module 830 may be used to classify candidate character locations (128/418) Among other things, the classifier engine 834 may be a Support Vector Machine (SVM) classifier employing a Radial Basis Function (RBF) kernel. The classifier model is stored in storage 838, which may be a section of storage 808.

An optical character recognition (OCR) engine 836 of the symbol recognition module 830 may process the grouped positively-classified regions and outliers to recognize contained text (e.g., alphanumeric text) (130/430). Any OCR algorithm or algorithms may be used, as known in the art.

Figure 9:
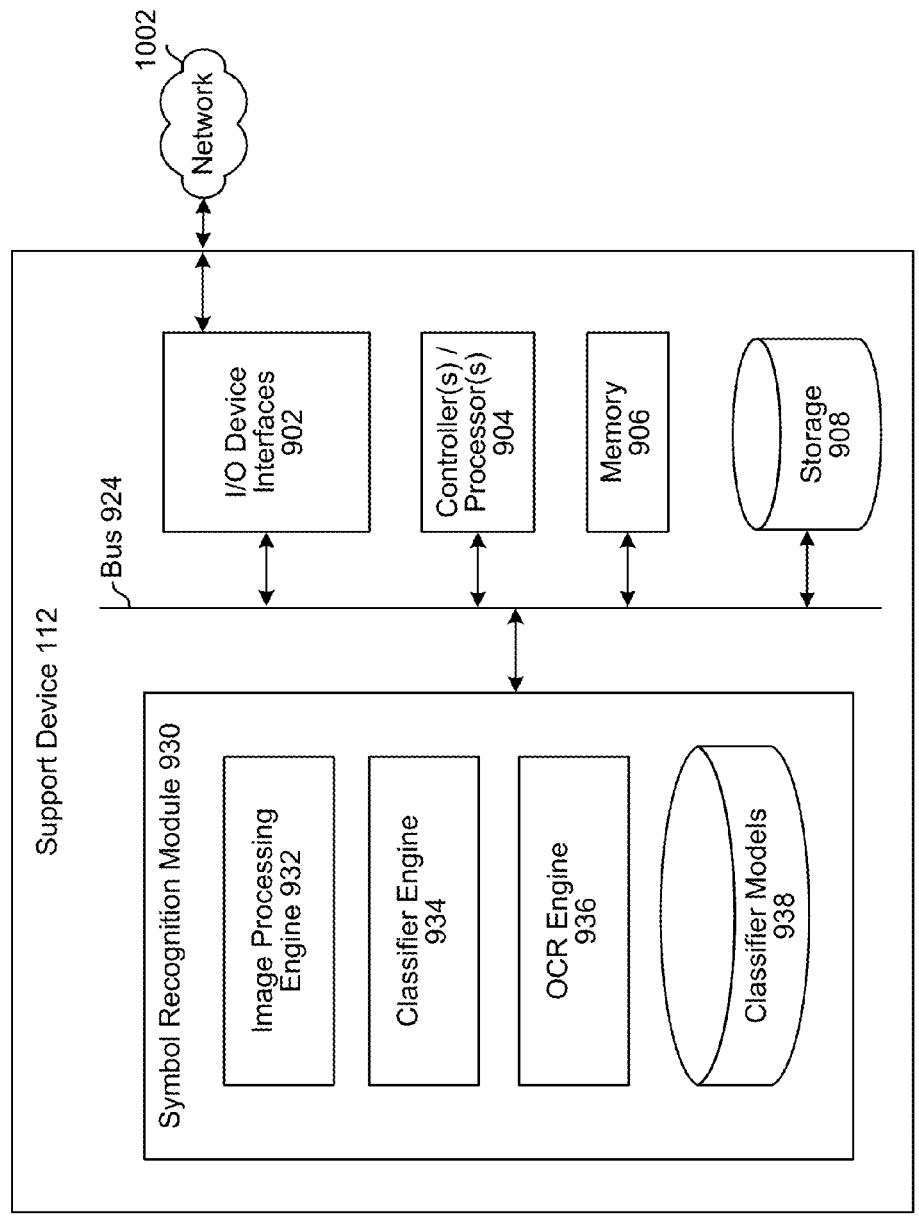
FIG. 9 is a block diagram conceptually illustrating example components of a network-connected support device configured for the system.

FIG. 9 is a block diagram conceptually illustrating example components of a network-connected support device 112 of the system 100. While some devices 110 that capture the image(s) may be able to execute their own processing pipeline, the task assignment engine 840 of a device 110 may delegate some tasks to the support device 112 to process the captured image (e.g., delegating OCR 130/430 processing to the support device 112). The task assignment engine 840 may transmit the data necessary to perform pipeline step(s) (e.g., a binarized image), together with an instruction to perform the pipeline step(s) and return send back the results. The device 110 output the received results (e.g., via display 818). In operation, the support device 112 may include computer-readable and computer-executable instructions that reside on the support device 112.

The support device 112 may include an address/data bus 924 for conveying data among components of the support device 112. Each component within the support device 112 may also be directly connected to other components in addition to (or instead of) being connected to other components across the bus 924.

The support device 112 may include one or more controllers/processors 904, that may each include a central processing unit (CPU) for processing data and computer-readable instructions, and a memory 906 for storing data and instructions. The memory 906 may include volatile random access memory (RAM), non-volatile read only memory (ROM), non-volatile magnetoresistive (MRAM) and/or other types of memory. The support device 112 may also include a data storage component 908, for storing data and controller/processor-executable instructions (e.g., instructions to perform the processes illustrated in and discussed in connection with FIGS. 1 and 4). The data storage component 908 may include one or more non-volatile storage types such as magnetic storage, optical storage, solid-state storage, etc. The support device 112 may also be connected to removable or external non-volatile memory and/or storage (such as a removable memory card, memory key drive, networked storage, etc.) through the input/output device interfaces 902.

Computer instructions for operating the support device 112 and its various components (such as the engines 932 to 936 of the symbol recognition module 930) may be executed by the controller(s)/processor(s) 904, using the memory 906 as temporary "working" storage at runtime. The computer instructions may be stored in a non-transitory manner in non-volatile memory 906, storage 908, or an external device. Alternatively, some or all of the executable instructions may be embedded in hardware or firmware in addition to or instead of software.

The support device 112 includes input/output device interfaces 902. A variety of components may be connected through the input/output device interfaces 902. The input/output device interfaces 902 may also include an interface for an external peripheral device connection such as universal serial bus (USB), Thunderbolt or other connection protocol. The input/output device interfaces 902 may also include a connection to one or more networks 1002 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1002, the system 100 may be distributed across a networked environment, as will be discussed further below with FIG. 10.

The support device 112 further includes a symbol recognition module 930 that performs the processes discussed in connection with FIGS. 1 and 4, and/or works in conjunction with other devices in the system 100. For example, a mobile device 110 may include the camera(s) 816 and capture the image to be processed, whereas the support device 112 includes part of the symbol recognition module 930 that processes the captured image.

The symbol recognition module 930 includes an image processing engine 932. Among other things, the image processing engine 932 identifies the set of candidate character regions (e.g., MSERs) (120/404), aggregates the identified positive regions into sequences and identifies lines (420), identifies outliers (422), groups the glyphs and outliers (424) for binarization, performs binarization (426), scans candidate regions to determine CV and the stroke-width to median diameter ratio (122-126, 410-416), and identifies other salient features used for glyph classification (e.g., Table 1). If any other pre-processing of the image is performed prior to classification (e.g., conversion to greyscale, pre-filtering MSERS 406), that may also be performed by the image processing engine 932.

A classifier engine 934 of the symbol recognition module 930 may be used to classify candidate character locations (128/418) Among other things, the classifier engine 934 may be a Support Vector Machine (SVM) classifier employing a Radial Basis Function (RBF) kernel. The classifier model is stored in storage 938, which may be a section of storage 908.

An optical character recognition (OCR) engine 936 of the symbol recognition module 930 may process the grouped positively classified regions and outliers to recognize contained text (e.g., alphanumeric text) (130/430). Any OCR algorithm or algorithms may be used, as known in the art.

How tasks are divided between the mobile device 110 and the support device 112 may be determined dynamically by task assignment engine 840 of the symbol recognition module 830. The task assignment engine 840 may determine a speed of the connection via network 1002 to the support device 112. Based on criteria such as the speed of the network connection, the computational complexity of the process steps, and the computational capabilities of the controller(s)/processor(s) 804, the task assignment engine 840 may apply load balancing heuristics to dynamically divide processing steps between the other engines of the symbol recognition module 830 of the device 110 and the symbol recognition module 930 of the support device 112.

The components of the device 110 as illustrated in FIG. 8 and the support device 112 as illustrated in FIG. 9 are exemplary, and may be a stand-alone device or may be included, in whole or in part, as a component of a larger device or system. Although the examples of the classifier engines 834 and 934 described above are Support Vector Machines (SVMs), other trained classifiers may be used, such as neural networks, decision trees, AdaBoost (short for "Adaptive Boosting") combined with decision trees, and random forests.

While the system 100 has been discussed in the context of glyph and text detection, any symbolic features may be identified and recognized using the techniques discussed herein, and other candidate region identification techniques may be used. For example, instead of MSERs (or in conjunction with MSERs), the candidate locations may be identified using histogram of oriented gradients (HoG) and Gabor features.

HoGs are feature descriptors used in computer vision and image processing for the purpose of object detection. The HoG technique counts occurrences of gradient orientation in localized portions of an image, and is similar to that of edge orientation histograms, scale-invariant feature transform descriptors, and shape contexts. However, HoG is different from these other techniques in that it is computed on a dense grid of uniformly spaced cells and uses overlapping local contrast normalization for improved accuracy. Locally-normalized HoG descriptors offer particular performance advantages relative to other existing feature sets, computed on a dense grid of uniformly spaced cells and using overlapping local contrast normalizations.

Gabor features are identified by a Gabor filter, which is a linear filter used for edge detection. Frequency and orientation representations of Gabor filters are similar to those of the human visual system, and they have been found to be particularly appropriate for texture representation and discrimination. In the spatial domain, a two-dimensional Gabor filter is a Gaussian kernel function modulated by a sinusoidal plane wave, applying image decompositions to identify and recognize objects.

The concepts disclosed herein may be applied within a number of different devices and computer systems, including, for example, image-scanning general-purpose computing systems, server-client computing systems, "smart" cellular telephone computing systems, personal digital assistants (PDAs), cameras, image scanners, tablet computers, wearable computing devices (glasses, etc.), other mobile devices, etc.

Figure 10:
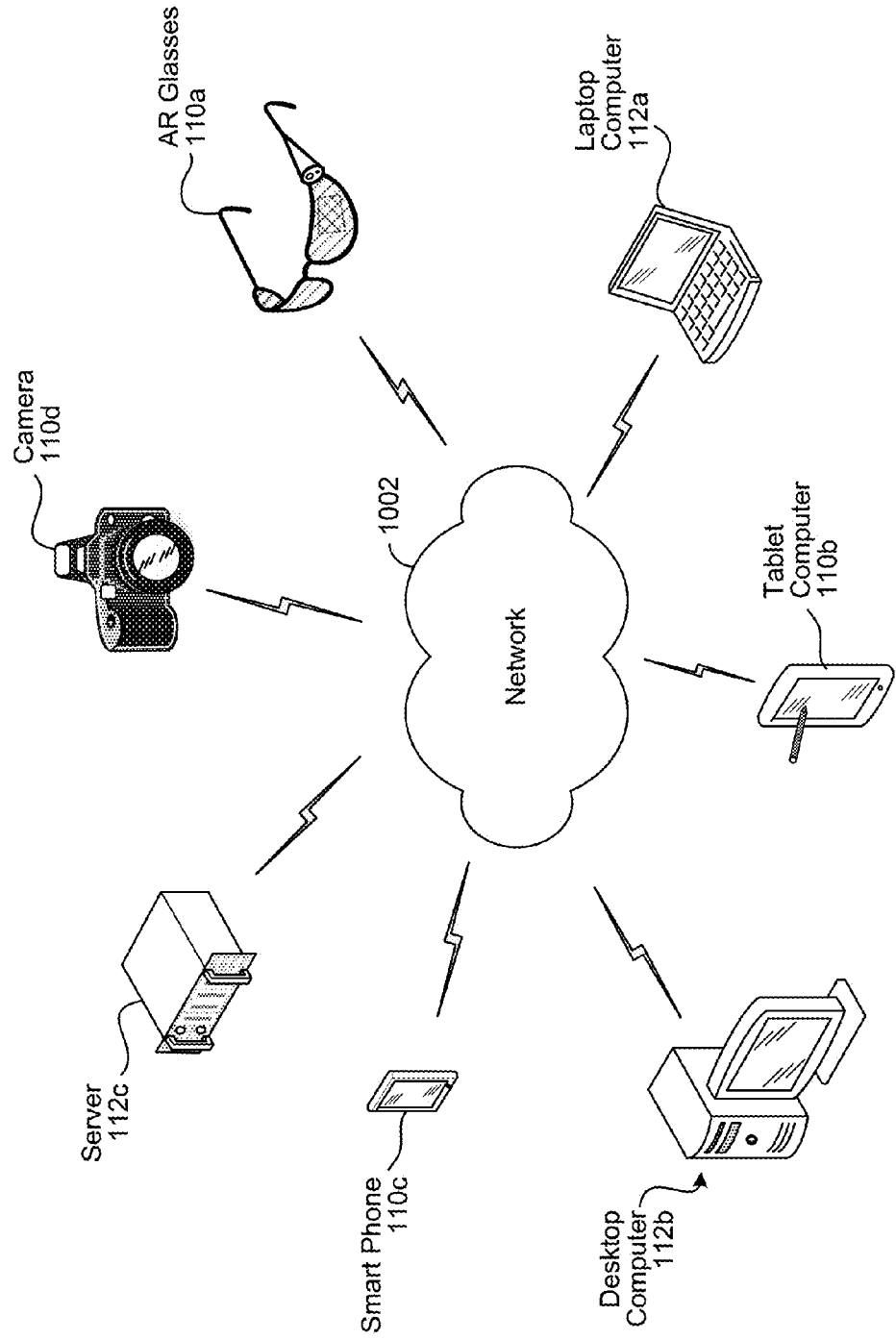
FIG. 10 illustrates an example of a computer network for use with the system in a distributed environment.

As illustrated in FIG. 10, multiple mobile devices (110a to 110c) may contain components of the system 100 and the devices may be connected over a network 1002. Network 1002 may include a local or private network or may include a wide network such as the internet. Devices may be connected to the network 1002 through either wired or wireless connections. For example, augmented reality (AR) glasses 110a, a tablet computer 110b, a smart phone 110c, and a camera 110d may be connected to the network 1002 through a wireless service provider, over a WiFi or cellular network connection or the like. Other devices are included as network-connected support devices 112, such as a laptop computer 112a, a desktop computer 110b, and a server 112c. The support devices 112 may connect to the network 1002 through a wired connection or wireless connection. Networked mobile devices 110 may capture images using one-or-more built-in or connected camera 816 or image capture devices, with processing performed by a symbol recognition module 830 of the same device or another device connected via network 1002, such as the symbol recognition module 930 of a support device 112.

The above examples are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, image processing, and optical character recognition (OCR) should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of the symbol recognition modules 830 and 930 may be implemented as firmware in hardware. For example, portions of the image processing engine 832 and 932 of the modules 830 and 930 may be implemented as a digital signal processor (DSP) and/or application-specific integrated circuit (ASIC).

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
   acquiring an image;
   extracting a first potential glyph region from the image as a maximally stable extremal region (MSER);
   identifying a plurality of points within the extracted first potential glyph region;
   for each point of the plurality of points:
      determining a horizontal scan segment, a vertical scan segment, and a diagonal scan segment based on transitions from light to dark and transitions from dark to light, and
      determining a shortest segment of the horizontal scan segment, the vertical scan segment, and the diagonal scan segment;
   determining a first parameter corresponding to a variation of stroke width within the first potential glyph region using the shortest segment for each point of the plurality of points, wherein the first parameter is computed using a standard deviation and a mean of the lengths of the shortest segment for each point of the plurality of points;
   determining a second parameter using a width of the first potential glyph region and a median of the lengths of the shortest segment for each of the plurality of points;
   classifying the first potential glyph region as containing a first glyph based on the first parameter and the second parameter; and
   performing optical character recognition (OCR) on the first glyph.

2. The method of claim 1, wherein an area of the image including the first potential glyph region comprises dark foreground features on a light background.

3. The method of claim 1, wherein each point of the plurality of points includes an intersection of a respective horizontal scan segment, a respective vertical scan segment, and respective diagonal scan segment.

4. A computing device comprising:
   at least one processor;
   a memory including instructions operable to be executed by the at least one processor to perform a set of actions to configure the at least one processor to:
      determine a first potential glyph region of an image;
      scan the first potential glyph region for horizontal scan segments, vertical scan segments, and diagonal scan segments based on transitions from light to dark and on transitions from dark to light;
      for each point of a plurality of points within the first potential glyph region, determine a shortest segment of a vertical scan segment, a horizontal scan segment, and a diagonal scan segment associated with the respective point;
      determine a first parameter using a first statistic based on a length of the shortest segment for of the plurality of points; and
      classify the first potential glyph region as containing a glyph based on the first parameter.

5. The computing device of claim 4, wherein each point of the plurality of points includes an intersection of a respective horizontal scan segment, a respective vertical scan segment, and a respective diagonal scan segment.

6. The computing device of claim 4, wherein the first statistic is standard deviation, and the first parameter is further based on a mean of the lengths of the shortest segment for each point of the plurality of points.

7. The computing device of claim 4, wherein the first statistic is a median or a mean of the length of the shortest segment for each point of the plurality of points, the first parameter being further based on a width of the first potential glyph region.

8. The computing device of claim 4, further comprising a communications interface, wherein the instructions further configure the at least one processor to:
 receive the image from another device via the communication interface.

9. The computing device of claim 4, wherein the first potential glyph region is a maximally stable extremal region (MSER).

10. The computing device of claim 9, wherein the instructions to classify the first potential glyph region further configure the at least one processor to classify the first potential glyph region as containing the glyph based on MSER features together with the first parameter, the MSER features including one or more of MSER's aspect ratio, compactness, solidity, stroke-width-to-width ratio, stoke-width-to-height ratio, convexity, raw compactness, and number of holes.

11. The computing device of claim 4, further comprising a classifier comprising one or more of a Support Vector Machine (SVM), a neural network, decision trees, AdaBoost combined with decision trees, and random forests, the instructions to classify the first potential glyph region configuring the at least one processor to input the first parameter into the classifier.

12. The computing device of claim 4, wherein the instructions further configure the at least one processor to:
 determine a second potential glyph region of the image;
 classify the second potential glyph region as not containing a glyph;
 determine a distance between the first potential glyph region and the second potential glyph region; and
 perform optical character recognition (OCR) on the first potential glyph region and the second potential glyph region based at least in part on the distance.

13. A non-transitory computer-readable storage medium storing processor-executable instructions for controlling a computing device, comprising program code to configure the computing device to:
 determine a first potential glyph region of an image;
 scan the first potential glyph region for horizontal scan segments, vertical scan segments, and diagonal scan segments based on transitions from light to dark and on transitions from dark to light;
 for each point of a plurality of points within the first potential glyph region, determine a shortest segment of a vertical scan segment, a horizontal scan segment, and a diagonal scan segment associated with the respective point;
 determine a first parameter using a first statistic based on a length of the shortest segment for each point of the plurality of points; and
 classify the first potential glyph region as containing a glyph based on the first parameter.

14. The non-transitory computer-readable storage medium of claim 13, wherein each of the plurality of points includes an intersection of a respective horizontal scan segment, a respective vertical scan segment, and a respective diagonal scan segment.

15. The non-transitory computer-readable storage medium of claim 13, wherein the first statistic is standard deviation, and the first parameter is further based on a mean of the length of the shortest segment for each point of the plurality of points.

16. The non-transitory computer-readable storage medium of claim 13, wherein the first statistic is a median or a mean of the length of the shortest segment for each point of the plurality of points, the first parameter being further based on a width of the first potential glyph region.

17. The non-transitory computer-readable storage medium of claim 13, wherein the extracted potential glyph region is a maximally stable extremal region (MSER).

18. The non-transitory computer-readable storage medium of claim 13, wherein the program code further configures the computing device to:
 receive the image from another device via a wireless communication interface.

19. The non-transitory computer-readable storage medium of claim 13, wherein the program code to classify the region further comprises code for classifying by one or more of a Support Vector Machine (SVM), a neural network, decision trees, AdaBoost combined with decision trees, and random forests.

20. The non-transitory computer-readable storage medium of claim 13, wherein the program code further configures the computing device to:
 determine a second potential glyph region of the image;
 classify the second potential glyph region as not containing a glyph;
 determine a distance between the first potential glyph region and the second potential glyph region; and
 perform optical character recognition (OCR) on the first potential glyph region and the second potential glyph region based at least in part on the distance.

* * * * *